United States Patent [19]

Liu et al.

[11] Patent Number: 4,469,838

[45] Date of Patent: Sep. 4, 1984

[54] NUCLEATING AGENTS FOR POLYCARBONATE RESINS PREPARED VIA TRANSESTERIFICATION OF BISPHENOL-A AND DIPHENYL CARBONATE

[75] Inventors: Ping Y. Liu, Naperville, Ill.; Allen W. Ko, Lenox, Mass.

[73] Assignee: General Electric Company, Pittsfield, Mass.

[21] Appl. No.: 349,603

[22] Filed: Feb. 17, 1982

[51] Int. Cl.³ .................. C08G 63/62; C08K 3/22; C08K 5/09
[52] U.S. Cl. ................................................. 524/394
[58] Field of Search ............... 528/196; 524/394, 401, 524/611; 260/DIG. 35

[56] References Cited

U.S. PATENT DOCUMENTS

| | | | |
|---|---|---|---|
| 3,326,880 | 6/1967 | Binsbergen | 260/DIG. 35 |
| 3,424,703 | 1/1969 | Jones | 524/611 |
| 3,492,268 | 1/1970 | Baker | 528/196 |
| 3,535,300 | 10/1970 | Gable | 528/196 |
| 3,819,595 | 6/1974 | Beck et al. | 260/DIG. 35 |
| 3,836,490 | 9/1974 | Bockmann et al. | 528/196 |
| 3,965,064 | 6/1976 | Mercier et al. | 260/DIG. 35 |
| 4,082,715 | 4/1978 | Mercier | 524/611 |
| 4,214,062 | 7/1980 | Binsack et al. | 528/196 |
| 4,237,034 | 12/1980 | Tomka et al. | 524/130 |
| 4,251,434 | 2/1981 | Mark et al. | 524/611 |
| 4,258,142 | 3/1981 | Ohzeki et al. | 524/141 |
| 4,263,201 | 4/1981 | Mark et al. | 525/148 |
| 4,289,685 | 9/1981 | Druschke et al. | 528/196 |

OTHER PUBLICATIONS

Chemical Abstracts, vol. 88, No. 8, Feb. 20, 1978, abstract 88:51547h.

Primary Examiner—Ronald W. Griffin
Attorney, Agent, or Firm—Hedman, Gibson, Costigan & Hoare

[57] ABSTRACT

A process for the manufacture of a crystallized polycarbonate resin prepared via the transesterification of a diaryl carbonate and a dihydric phenol comprising adding to the polycarbonate resin a minor amount of a lithium compound nucleating agent.

7 Claims, No Drawings

NUCLEATING AGENTS FOR POLYCARBONATE RESINS PREPARED VIA TRANSESTERIFICATION OF BISPHENOL-A AND DIPHENYL CARBONATE

BACKGROUND OF THE INVENTION

The present invention provides for a novel method for affecting the optical clarity of polycarbonate resin which has been prepared via the transesterification of a diaryl carbonate and a dihydric phenol, which involves adding to the polycarbonate resin a minor but effective amount of a lithium compound nucleating agent.

It is known that various aromatic polyaryl esters or polyarylates may be prepared by transesterification and polycondensation of mixtures of diaryl esters of aromatic carboxylic acids, together with diaryl carbonate, if desired, and dihydric phenols, and that polycarbonates may be prepared by transesterification of a diaryl carbonate with a dihydric phenol. In this application, polyarylates are considered to be polycarbonates in which all or part of the carbonic acid residues are replaced by aryl dicarboxylic acid residues, preferably isophthalic and/or terephthalic acid residues.

A transesterified polycarbonate resin, employable for purposes of this invention, is suitably prepared by blending, e.g., diphenyl carbonate and bisphenol-A as a melt in the presence of an appropriate catalyst. The molecular weight of the resulting resin is preferably in the range between 8,000 to 100,000, preferably 10,000 to 80,000, and exhibits an intrinsic viscosity between 0.4 to 0.7 dl/g.

Conventionally, in carrying out the transesterification process, the reaction components are passed through a number of stages involving melting the reaction components, reacting the components, pre-polymerizing the reaction product and, finally, polymerizing the effluent from the pre-polymerization stage in a final polymerization stage.

Heretofore, in processes employing the aforementioned series of steps, thin film evaporators have been employed only in the final polymerization stage.

One disadvantage with the various processes conventionally employed in the art lies in the fact that the speed of the pre-polymerization step is limited by mass transfer constraints brought about by the formation of byproducts of the reaction, which ultimately necessitates a minimum residence time under the specific reaction conditions in order to effect the degree of product formation desired.

A new method for the transesterification of a diaryl carbonate and dihydric phenol which allows for shorter residence time in the pre-polymerization stage of the reaction process, and thus produces an enhanced yield of reaction product in less time, comprises using a series of equipment including a melter, a reactor, a pre-polymerization reactor and then more polymerization reaction vessels.

The utilization of non-ferrous reaction vessel components, such as, nickel, titanium, chromium metals or the like for all contact surfaces, in such a system, such as for pipings, reactor, and/or recovering vessels, etc., clad or lined with such materials or with glass, provides a superior system for producing polycarbonate resin via the transesterification reaction, since the resultant product will be free from undesirable color formation.

U.S. patent application Ser. No. 176,865, filed Aug. 10, 1980, which is also assigned to the assignee of the present application, discloses such a reaction system and the teachings of that disclosure are also incorporated herein by reference and may be utilized to advantage in preparing the resin to be utilized in the crystallization process of the present invention.

Said application also discloses that carrying out the reaction to produce a polycarbonate resin via the transesterification of a diaryl carbonate and a dihydric phenol, allowing the components to reach equilibrium in an inert atmosphere in the melt-reaction step prior to introducing such partially reacted components to a series of ester-interchange reaction vessels, which are operated under vacuum, wherein the excess phenol produced is removed via distillation and the entrained diphenyl carbonate is refluxed to the ester-interchange reaction vessel, and carrying out the reaction in a totally non-ferrous material environment allows for the production of a product in higher yield and shorter residence time than has heretofore been possible.

In carrying out the transesterification of diphenyl carbonate and bisphenol-A to produce a bisphenol-A polycarbonate, with the removal of phenol, various lithium salts are known to have utility as catalysts for the reaction. Typically, lithium salts such as the various lithium halides and lithium hydroxides have been employed for this purpose. It has been found, however, that the effectiveness of the lithium salts which are conventionally employed for carrying out the transesterification of bisphenol-A and diphenyl carbonate is limited by the fact that such salts are only partially soluble in the reaction medium.

The polycarbonate resins produced via the transesterification of a diaryl carbonate and a dihydric phenol find utility in the production of various films and similar materials, wherein controlled crystallization of the resinous materials is effected via known techniques. Control by crystallinity is important in achieving optical clarity and the best impact properties in films and thicker molded articles.

The present invention provides for a beneficial method for promoting and enhancing the controlled crystallization of polycarbonate resins produced via the transesterification of a diaryl carbonate and dihydric phenol which allows for the production of sheet and film material having improved characteristics over those produced using prior art methods. It is based on the addition of lithium compounds in very small amounts to transesterified polycarbonates.

SUMMARY OF THE INVENTION

In accordance with the present invention, there is disclosed a method for promoting and enhancing the crystallization, optical clarity and impact resistance of polycarbonate resins prepared by the transesterification of a diaryl carbonate and a dihydric phenol, said method comprising adding to the polycarbonate resin a minor but effective amount of a lithium compound nucleating agent, said nucleating agent being selected from inorganic lithium compounds and organic lithium compounds such as lithium stearate, and allowing the composition to crystallize, to a desired degree of crystallinity at a controllable crystallization rate.

DETAILED DESCRIPTION OF THE INVENTION

It has been found in the processing of polycarbonate resin produced via the transesterification of a diaryl carbonate and a dihydric phenol that the addition of minor but effective amounts of a lithium compound effectively controls the rate or crystallization of such resins leading to the formation of film and sheet materials having improved overall characteristics in comparison with similar materials produced using prior art techniques.

Various methods for preparing polycarbonate resinous films and sheets are known in the art and require no further elaboration. Up until now partially crystallized polycarbonate films or sheets have been produced by retarding the rate of solvent removal or by treating the clear amorphous film with swelling agents after casing. In either process, the procedure is time consuming and difficulty is encountered in controlling the degree of crystallinity.

In contrast, by employing the lithium compound nucleating agents in the method of this invention, crystallized transparent and higher strength transesterified polycarbonate films can be readily and efficiently produced by casting, extruding or compressing the precrystallized pellets.

In carrying out the method of the present invention for controlling the crystallization rate of a polycarbonate resin prepared by the transesterification of a diaryl carbonate and a dihydric phenol, it has been found that by incorporating a minor but effective amount of a lithium compound nucleating agent to said polycarbonate resin beneficially promotes crystallization of the treated polycarbonate resin. The resulting treated, crystallinity-enhanced polycarbonate resins are highly effective in preparing polycarbonate film or sheet materials having improved physical properties over those prepared in accordance with prior art methods.

Preferably, diphenyl carbonate and biphenol-A are used in the transesterification reaction, although, it is understood that the present invention contemplates polycarbonate resins prepared from other dihydric phenols and diaryl carbonates well-known in this art.

The lithium compound nucleating agent employed in the herein disclosed method can be an inorganic material or it can be of the organic type. Suitable examples of organic lithium compound is preferably a lithium acylate in which the acyl group is derived from an organic acid containing from 6 to 25 carbon atoms, most preferably lithium stearate.

The nucleating agent described above is added in amounts of from about 4 to about 14 ppm, preferably 10 to 14 ppm, based on the total weight of the composition.

The nature of the present invention may be more clearly understood by recourse to the following examples which are set forth for illustrative purposes only and are not to be construed as limiting the invention thereto.

EXAMPLES 1–4

Various examples of bisphenol-A polycarbonate films were prepared from resins produced via the transesterification of diphenyl carbonate and bisphenol-A, both with and without the addition of small amounts of the crystallization controlling agents of the present invention.

Product compositions, optical and physical properties for the resultant materials are set forth in the attached Table 1.

TABLE 1

| EXAMPLE OF NUCLEATED TRANSESTERIFIED POLYCARBONATE | | | | | |
|---|---|---|---|---|---|
| EXAMPLE | CONTROL | 1 | 2 | 3 | 4 |
| Nucleating Agent | None | LiOH | LiOH | $LiC_{18}H_{35}O_2$ | $LiC_{18}H_{35}O_2$ |
| Contents, ppm | | 5.0 | 10.0 | 5.0 | 10.0 |
| Crystallinity, % | NDA | NDA | NDA | 0.62 | 1.28 |
| Optical Properties, ⅛ in. chip | | | | | |
| Transmission, % | | | | | |
| Unaged | 86.3 | 86.9 | 86.3 | 86.7 | 87.4 |
| 90° C. 8 hr. aged | 86.3 | 86.6 | 85.6 | 86.9 | 87.3 |
| Haziness, % | | | | | |
| Unaged | 4.7 | 1.4 | 1.4 | 0.8 | 0.4 |
| 90° C. 8 hr. aged | 4.7 | 1.1 | 1.5 | 1.1 | 1.0 |
| Yellowness Index (YI) | | | | | |
| Unaged | 8.1 | 8.9 | 9.5 | 8.4 | 8.0 |
| 90° C. 8 hr. aged | 8.1 | 8.9 | 9.5 | 8.4 | 8.0 |
| Notched Izod, *ft-lb. hr. ⅛ in. bar | | | | | |
| Unaged | $15.3^{100}$ | $15.3^{100}$ | $14.7^{100}$ | $14.7^{100}$ | $14.7^{100}$ |
| 90° C. 8 hr. aged | $12.6^{80}$ | $12.4^{80}$ | $11.9^{80}$ | $9.9^{60}$ | $14.7^{100}$ |

NOTES:
NDA - non detectable
*superscript represents the percentage of ductile failure for example, $12.4^{80}$ means the sample has 12.4 ft-lb/in impact strength, four of five evaluated samples failed in ductile mode, one brittle.

The results shown in Table 1 illustrate that incorporating 5 and 10 ppm of lithium hydroxide, and 5 and 10 parts of lithium stearate, significantly reduces the haziness, even for samples aged at 90° C. for 8 hours. Furthermore, the addition of lithium stearate at 10 ppm. improves transparency by reducing yellowness index and also improves thermal stability as shown by the 100% ductility retention for the aged samples. Finally, the excellent results on haziness obtained with the simple method of the present invention can only be obtained conventionally by difficult and expensive steps like retarding solvent removal or swelling the films.

While the invention has been described with reference to a number of embodiments it will be apparent to one skilled in the art that there are numerous additional variations which properly fall within the scope of the invention. Therefore, it should be understood that the foregoing embodiments and examples are set forth to illustrate the advantages which may be achieved utilizing the present invention and should not be interpreted as limiting the scope of the invention.

We claim:
1. A method for controlling the crystallization and enhancing the optical transparency of a polycarbonate resin prepared by the transesterification of a diaryl carbonate and a dihydric phenol which comprises adding to said polycarbonate resin a minor effective amount of a nucleating agent consisting essentially of lithium hydroxide or lithium stearate, and allowing the resin to crystallize to a desired degree of crystallinity.

2. A method according to claim 1 wherein the diaryl carbonate is diphenyl carbonate and the dihydric phenol is bisphenol-A.

3. A method according to claim 1 wherein said nucleating agent is added in an amount of from about 4 to about 16 ppm based on the total weight of the composition.

4. A method according to claim 1 wherein said nucleating agent is added in an amount of from 5 to 10 ppm based on the total weight of the composition.

5. A method for controlling the crystallization and enhancing the optical transparency of a polycarbonate resin prepared by the transesterification of a diaryl carbonate and a dihydric phenol which comprises adding to said polycarbonate resin a minor effective amount of from about 4 to about 16 parts per million, based on the total weight of the resin, of a nucleating agent selected from lithium hydroxide or lithium stearate, and allowing the resin to crystallize to a desired degree of crystallinity.

6. A method for controlling the crystallization and enhancing the optical transparency of a polycarbonate resin prepared by the transesterification of a diaryl carbonate and a dihydric phenol which comprises adding to said polycarbonate resin a minor effective amount of a nucleating agent consisting essentially of lithium hydroxide, and allowing the resin to crystallize to a desired degree of crystallinity.

7. A method for controlling the crystallization and enhancing the optical transparency of a polycarbonate resin prepared by the transesterification of a diaryl carbonate and a dihydric phenol which comprises adding to said polycarbonate resin a minor effective amount of a nucleating agent consisting essentially of lithium stearate, and allowing the resin to crystallize to a desired degree of crystallinity.

* * * * *